June 29, 1926.

W. R. ZIMMERMAN 1,590,922

THERMOSTATIC VALVE

Filed April 7, 1926

INVENTOR.
William R. Zimmerman
BY
Fay, Oberlin & Fay
ATTORNEYS.

Patented June 29, 1926.

1,590,922

UNITED STATES PATENT OFFICE.

WILLIAM R. ZIMMERMAN, OF CLEVELAND, OHIO, ASSIGNOR TO THE BISHOP & BABCOCK MANUFACTURING COMPANY, OF CLEVELAND, OHIO, A CORPORATION OF OHIO.

THERMOSTATIC VALVE.

Application filed April 7, 1926. Serial No. 100,277.

The present invention, relating, as indicated, to thermostatic valves is more particularly directed to an improved thermostatically controlled valve for use in connection with a circulatory system of an internal combustion engine for controlling the flow therethrough as a function of the temperature of the circulatory liquid. A further object of the invention is the provision of a simple and inexpensive device which may be used for the purpose stated, and which shall have a minimum of parts and may be employed either within the casing to which it is secured or merely inserted within one of the conduits of the circulatory system at a suitable point. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1:
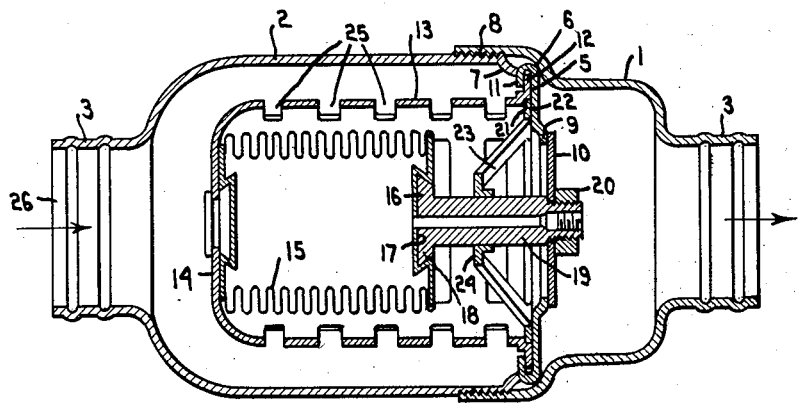
Figure 2:
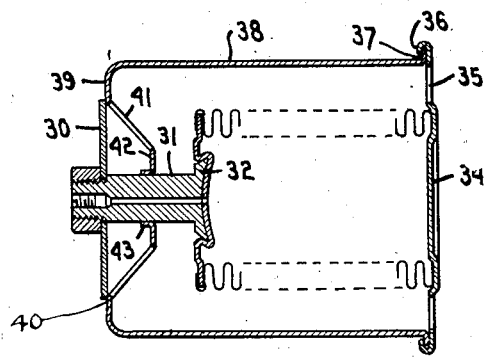

Fig. 1 is a longitudinal central section through my improved device; and Fig. 2 is a similar view showing a modification of the same.

Referring now to Fig. 1, there is shown a two-part conduit consisting of portions 1 and 2, each of which is provided with cylindrical end portions 3 provided with corrugations in the outer surface adapting them to be slipped within, and engaged with, flexible conduits which usually connect the upper portions of manifold of the water jacket of an internal combustion engine with the radiator. Disposed within the conduit formed by the portions 1 and 2 is a transverse partition 5 which is clamped between an inwardly extending shoulder 6 on the conduit section and an inwardly directed flange 7 on the conduit section 2 and is held in secure engagement therebetween by threading 8, by means of which the two sections of the conduit are engaged together. This transversely extending partition 5 is provided with a portion 9 which serves as a seat 4 of valve 10 which, when engaged with the seat, closes the conduit to the flow of a liquid therethrough.

Secured between the partition 5 and a rebent flange 11 on the same is an outwardy extending flange 12 formed as a part of a cylindrical frame or cage 13, which extends longitudinally and concentrically within the conduit formed of the parts 1 and 2 and forms a casing with the partition 5. To the inner surface of the other end 14 of this cage is secured one end of a cylindrical corrugated expansible and contractible metal cylinder or bellows 15. The other end of the bellows 15 is sealed by means of a head or disk 16 which is provided with a recess 17, in which is clamped a flange 18 formed on a stem 19, which extends outwardly past the end 12 of the cage 13, and carries on its outer end the valve 10 which is secured thereto by means of a suitable nut 20. The bellows is hermetically sealed when mounted in the position described and is filled with a thermosensitive fluid which is charged into the bellows under less than atmospheric pressure so that at normal temperatures there exists within the bellows a subnormal pressure. This sub-normal pressure tends to hold the valve 10 on the valve seat 9 and the entire bellows and cage may be so positioned with respect to the valve seat that it is necessary to slightly expand the bellows during assembly to permit it to seat, thereby adding the normal resilience of the walls of the bellows to the sub-normal pressure, both of these forces acting to maintain the valve on its seat.

Clamped between a recessed edge 21 on the flange 12 of the cage 13 and the transverse partitions 5 is a disk 22 which is provided with a series of spaced radially inwardly extending arms 23, which, at their inner ends, are secured to an integral ring 24 which is provided with a central aperture, within which is received and guided the stem 19 on the valve. These arms 23 extend at an angle to the plane of the ring 22 and thus bring the ring 24 a suitable distance from the valve 10 and a predetermined distance from the end 16 on the expansible and contractible bellows. This ring therefore serves as a combined guide and stop for the bellows and the valve secured thereto, preventing the valve from being carried too far outwardly into the casing 1 and causing the valve to move in a predetermined line of movement which is parallel to the central longitudinal axis of the casing. In this way the valve is always caused to seat evenly against its seat 9 regardless of any uneven action in the wall of the corrugated bellows which might otherwise tend to produce an angular movement of the valve.

The cage 13 is provided with a series of openings 25 which permit the liquid which enters the casing in the direction of the arrow 26 to flow through the cage around the bellows, and, after the bellows has been expanded by a predetermined increase in the temperature of the cooling liquid, between the arms 23 and through the open valve and then out through the other end of the casing. The cage forms not only a mounting for the bellows and also a protective covering therefor preventing injury during shipment and handling, but also allows the cage and partition 5 to be employed without any assembled housing or sectional conduit, such as is here shown, if desired. In such an event the cage and partition, which form a casing as stated, together with the associated parts, the bellows, valve and stem, are merely pushed into the expansible conduit, usually of rubber, which connects the engine cylinders with the radiator, the turned-over flange on the partition 5 serving to slightly distend and engage within the rubber conduit, thus holding the device in the proper position with respect to such conduit, and at the same time protecting the bellows against any damage caused by collapsing of the conduit.

In Fig. 2 I have shown a modification of the construction previously described. In this device the action between the valve 30, the stem 31 and the end-closing member 32 of the bellows 33 are substantially as previously shown. The other end of the bellows is sealed to a transversely extending plate or disk 34 provided with a series of openings 35 and with an inwardly extending rebent flange 36. Between the flange 36 and the adjacent wall of the end member 34 is secured a flange 37 formed on a cylindrical shell 38, the engagement being effected by positioning the two parts as indicated and then spinning over or otherwise bending the flange 36 to securely engage and seal the flange 37 against the disk 34. The cylindrical member 38 is provided with an inturned flange 39 at its other end, which provides a seat 40 for the valve 30 and from this flange, adjacent to the seat portion, there extends inwardly a series of radially spaced arms 41, which are connected together at their inner ends by a ring 42 provided with a flange 43 which receives and guides the stem 31. This ring 42 also serves as a stop for limiting the expansion of the bellows.

The device when constructed as just described with the shell 38 and plate 34 forming a casing may either be employed in a housing or sectional conduit such as is shown in Fig. 1, in which event the engaged flanges 36 and 37 are suitably engaged between such conduit sections or it may be used as a device to be inserted within a hose line in the manner previously described. In either event the flow of circulating liquid enters the cylindrical member 38 through the openings 35, surrounds the bellows and then, upon the opening of the valve 30, flows between the arms 41 and through the open valve, the direction of flow of the circulating liquid being from the fixed end of the bellows toward the movable end or valve. The bellows may be charged with a suitable volatile fluid adapted to expand and cause an expansion of the bellows upon a predetermined rise in its temperature, and should be filled under a sub-normal pressure in order that this sub-normal pressure will act to maintain the valve 30 against its seat until there is a material rise in the pressure because of the increase in temperature.

In both of the devices shown in Figs. 1 and 2 the area of the valve should be greater than the effective area of the end of the bellows in order that the pressure of the cooling liquid against the valve may be greater than the pressure of the liquid against the bellows and in this way insure an opening of the valve in case of the failure of the bellows wall through breakage or leakage. It will be evident that the difference in the area between the valve and the bellows end should be determined by the pressure which is to exist in any given circulating system, a low pressure requiring a greater difference in area than a high pressure.

The present device is simple in construction and convenient and economical to assemble and is formed of relatively few parts, which may be of pressed sheet metal and are therefore relatively inexpensive.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a device of the character described, the combination of a casing adapted to be fixed within a circulatory conduit and having spaced openings therein for the flow of liquid therethrough, an expansible and contractible thermostatic element mounted on said casing, a valve secured to said element, said valve closing the passage of liquid through said casing in the contracted position of said element, and said casing carrying a member extending transversely with respect to the line of movement of said valve and into the path of movement of said element upon expansion for limiting the movement thereof.

2. In a device of the character described, the combination of a casing adapted to be fixed within a circulatory conduit and having spaced openings therein for the flow of liquid therethrough, a thermostatically controlled valve structure including an expansible and contractible thermostatic element and a valve connected thereto, said valve closing the passage of liquid through said casing in the contracted position of said element, and means integral with said casing extending transversely with respect to the line of movement of said valve and into the path of movement of said element upon expansion for limiting the movement thereof.

3. In a device of the character described, the combination of a casing adapted to be fixed within a circulatory conduit and having spaced openings therein for the flow of liquid therethrough, a thermostatically controlled valve structure including an expansible and contractible thermostatic element and a valve connected thereto, said valve closing the passage of liquid through said casing in the contracted position of said element, and means carried by said casing for directing the movement of said valve structure.

4. In a device of the character described, the combination of two cylindrical members provided with interengaging threaded portions permitting aligned engagement of said members to form a housing, one of said members having an inwardly extending shoulder adjacent its engaged end, and the other of said members having an inwardly directed portion extending into proximity to said shoulder, and a thermostatically controlled valve device, said device being disposed longitudinally of said casing and said device and having an extending portion clamped between said shoulder and said extending portion on said cylindrical members respectively.

5. In a device of the character described, the combination of a casing, adapted to be inserted in a conduit, having an open passage and a valve seat surrounding the same, a valve adapted to engage said seat, a thermostatic element supported within said casing, a stem connected to said last named element and said valve, and open guide means for said stem lying in a plane intermediate the plane of said valve seat and the plane of the adjacent end of said thermostatic element.

6. In a device of the character described, the combination of two cylindrical members provided with inter-engaging threaded portions permitting aligned engagement of said members to form a housing, a casing, a circumferential flange formed on said casing and adapted to be engaged between said two cylindrical members, said casing having an open passage and a valve seat surrounding the same, a valve adapted to engage said seat, a thermostatic element supported within said casing, a stem connected to said last named element and said valve, and open guide means for said stem lying in a plane intermediate the plane of said valve seat and the plane of the adjacent end of said thermostatic element.

7. In a device of the character described, the combination of a frame member adapted to be fixed within a circulatory conduit, said member having an opening therethrough and a valve seat surrounding such opening, and said member also having an apertured portion extending inwardly from said seat portion and terminating in a guide, an expansible and contractible thermostatic element, a valve, a stem connecting said valve and one end of said element, and said stem slidably received within said guide, and a second frame member rigidly secured to said first frame member, said second frame member having openings therein and constituting, with said first frame member, an open casing for said element, and being secured to the end of said element opposite to the end carrying said stem.

8. In a device of the character described, the combination of a cylindrical frame member adapted to be fixed within a circulatory conduit, said member having a closed end and an opening therethrough and a valve seat surrounding said opening, and said member also having a plurality of radial arms extending inwardly from said seat portion and terminating in a guide, an expansible and contractible thermostatic element, a valve, a stem connecting said valve and one end of said element, said stem being slidably received within said guide, and said guide serving to limit the motion of said thermostatic element, and a second frame member secured to said first named frame member, said second frame member having openings therein and constituting, with said first frame member, an open casing for said element, and being secured to the end of said element opposite to the end carrying said stem.

9. In a device of the character described, the combination of a cylindrical frame member adapted to be fixed within a circulatory conduit, said member having a closed end and an opening therethrough and a valve seat surrounding said opening, and said member also having a plurality of radial arms extending inwardly from said seat portion and terminating centrally in a hub-like guide, an expansible and contractible thermostatic element, a valve, a stem connecting said valve and one end of said element, said stem being slidably received within said guide, and said guide serving to limit the motion of said thermostatic element, and a second frame member having openings therein and constituting, with said first frame member, an open casing for said element and being secured to the end of said element opposite to the end carrying said stem.

10. In a device of the character described, the combination of a pair of frame members united to form an open casing, one of said members being provided with a valve seat and an opening adjacent thereto, an expansible and contractible thermostatic element disposed within said casing and supported on the other of said frame members, a valve supported on said thermostatic element and adapted to engage said seat and means associated with said casing to limit the expansion of said thermostatic element.

11. In a device of the character described, the combination of a pair of frame members united to form an open casing, one of said members being provided with a valve seat and an opening adjacent thereto, an expansible and contractible thermostatic element disposed within said casing and supported on the other of said frame members, a valve supported on said thermostatic element and adapted to engage said seat and means projecting from said casing between the plane of said valve seat and the adjacent face of said thermostatic element to limit the expansion of said thermostatic element.

12. In a device of the character described, the combination of a pair of frame members united to form an open casing, one of said members being provided with a valve seat and an opening adjacent thereto, an expansible and contractible thermostatic element disposed within said casing and supported on the other of said frame members, a valve supported on said thermostatic element and adapted to engage said seat and means projecting from said casing between the plane of said valve seat and the adjacent face of said thermostatic element serving as a combined valve guide and stop to limit the expansion of said thermostatic element.

13. In a device of the character described, the combination of a cylindrical shell having one closed end provided with a valve seat having a valve opening adjacent thereto and a guide portion providing an opening disposed concentrically within said seat, an expansible and contractible thermostatic element disposed within said shell and having one end fixed to the open end of said shell, a valve, and a stem extending from said valve to said thermostatic element, said stem being slidably received within and guided by the walls of said guide opening in the closed end of said shell.

14. In a device of the character described, the combination of a cylindrical shell having one end open and the other end provided with a transverse plate having a valve seat on its outer surface, a series of spaced radial arms extending inwardly and a ring connecting the inner ends of said arms, and said ring having a central guide opening therethrough, an expansible and contractible thermostatic element disposed within said shell and having an apertured end plate fixed to the open end of said shell, a valve, and a stem extending from said valve to said thermostatic element, said stem being slidably received in such guide opening in said ring.

Signed by me, this 6th day of April, 1926.

WILLIAM R. ZIMMERMAN.